United States Patent [19]

Planebo

[11] 4,239,170
[45] Dec. 16, 1980

[54] MEANS FOR SUPPORTING A WRITING BOARD OR THE LIKE

[75] Inventor: Sten Planebo, Järfälla, Sweden

[73] Assignee: Pendax Interior AB, Stockholm, Sweden

[21] Appl. No.: 866,231

[22] Filed: Jan. 3, 1978

[30] Foreign Application Priority Data

Jan. 4, 1977 [SE] Sweden .................................. 7700055
Oct. 7, 1977 [SE] Sweden .................................. 7711300

[51] Int. Cl.³ ........................................... F16M 13/00
[52] U.S. Cl. ................................................. 248/441 B
[58] Field of Search ................ 248/489, 494, 495, 496

[56] References Cited

U.S. PATENT DOCUMENTS

| | | | |
|---|---|---|---|
| 1,424,405 | 8/1922 | Haughton | 248/494 |
| 4,067,537 | 1/1978 | Pejrud | 248/489 |

FOREIGN PATENT DOCUMENTS

275782 8/1927 United Kingdom ..................... 248/489

Primary Examiner—William H. Schultz
Attorney, Agent, or Firm—Holman & Stern

[57] ABSTRACT

Means for supporting a writing board, overhead screen, notice board or the like, including a pair of upper arms carried by the article with notches or recesses opening downwardly thereon for riding on one of, preferably, a plurality of rails of a horizontally fixed fitting, with a pair of lower arms fastened to the article and adapted to lean against a fixed wall below the horizontal fitting. Preferably, the upper arms are pivotable about a horizontal axis to permit inclination of the article relative to the fitting. A second rail can be provided to carry an additional article with shorter supporting arms, so that one article can be displaced laterally relative to the other without being taken down from the fitting.

2 Claims, 9 Drawing Figures

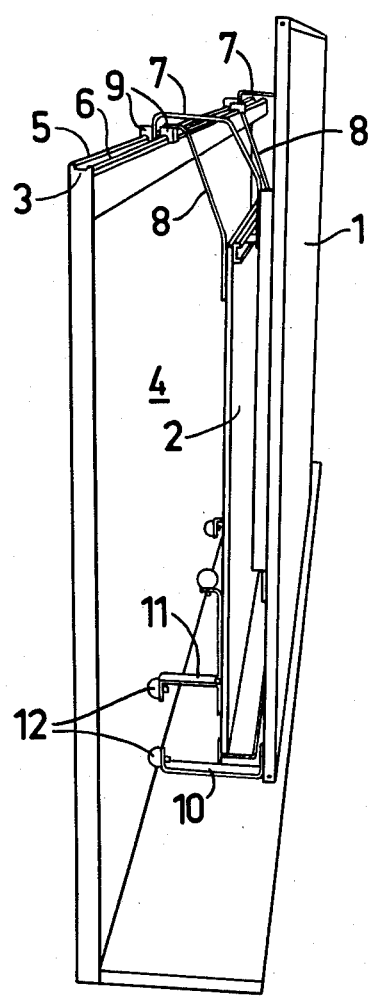
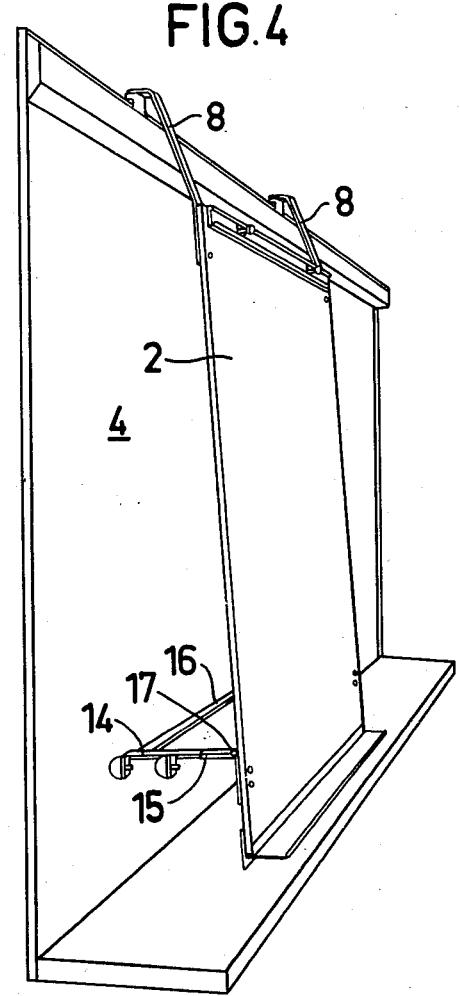

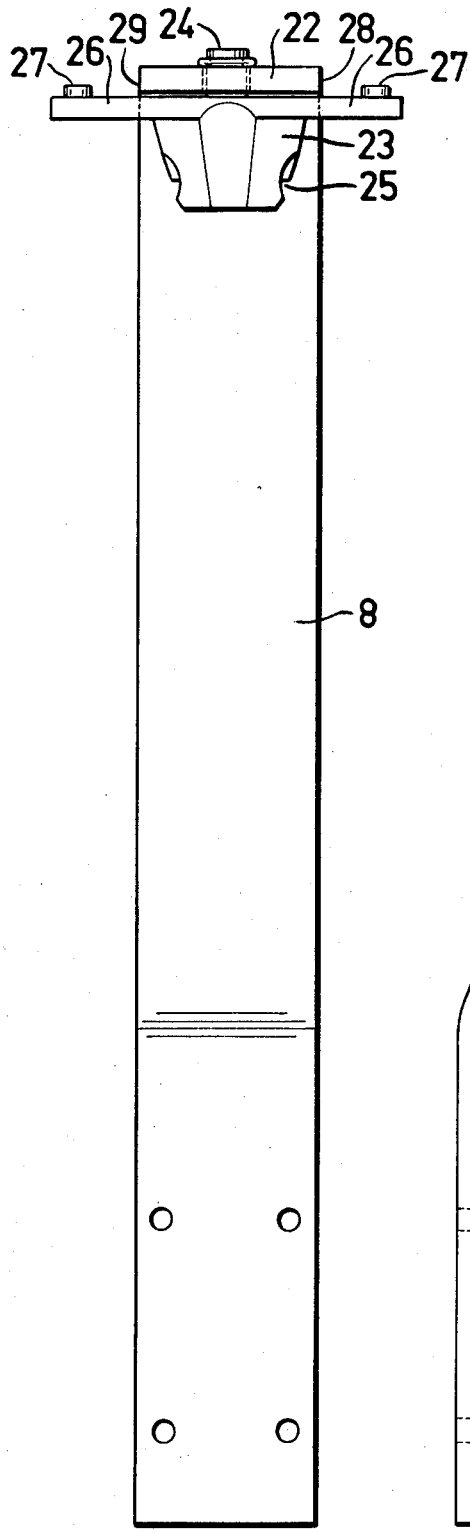
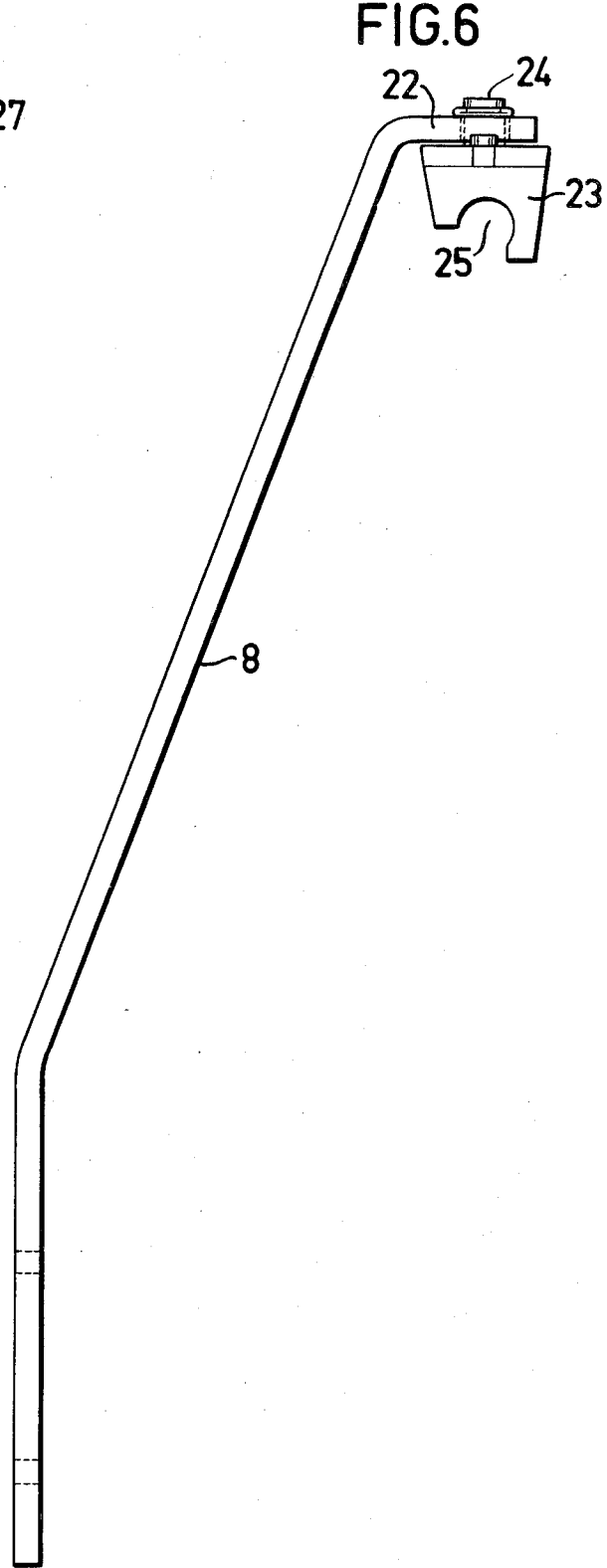

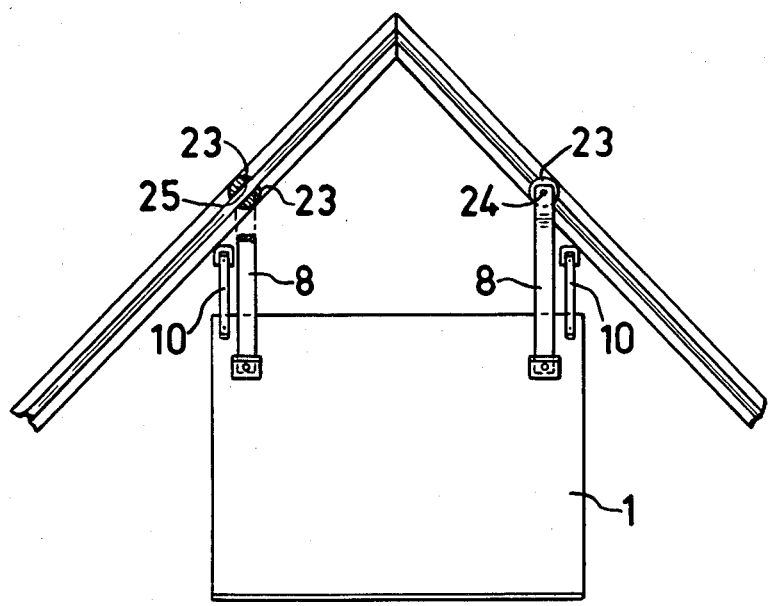

MEANS FOR SUPPORTING A WRITING BOARD OR THE LIKE

This invention relates to means for supporting a writing board, overhead screen, notice board or the like and consists of two upper arms fastened to the board and suspended displacable with their upper ends in a horizontally placed fittings, which are fixed to a wall or the similar, said means also including two lower arms joined to the board and resting on a wall or a part of a wall.

The object of the invention is to provide a supporting means capable of varying the inclination of the board in relation to a vertical wall while the board is displacable along the vertical wall, which may be a fixed support of any kind. An advantage of the invention is that two boards can be arranged alongside one another so that one of them can pass over the other or, in other words the second board can be shifted from a left position to a right position in relation to the first board without being taken down from the fittings.

Another object of the invention is to make it possible to place the board against two walls meeting in a corner of a room, whereby two parts of the fittings meet under an angle of 90° in a horizontal plane.

The invention is characterized in that the two upper arms have one recess each, which is open downwards and partly surrounds the fittings, said fittings being a bar or a rail, whereby said upper arms and said lower arms are swingable in relation to each other and in relation to a horizontal axis.

Two embodiments of the invention will be described with reference to the accompanying drawings.

FIG. 2 is a second perspective of the two boards according to FIG. 1 whereby one of the boards is placed outside the second board.

FIG. 4 shows a second embodiment of the invention.

FIG. 5 is a front view of one of the upper arms.

FIG. 6 is a side view of the arm according to FIG. 5.

FIG. 9 is a top plan view showing the invention mounted in two intersecting walls.

Figure 1:
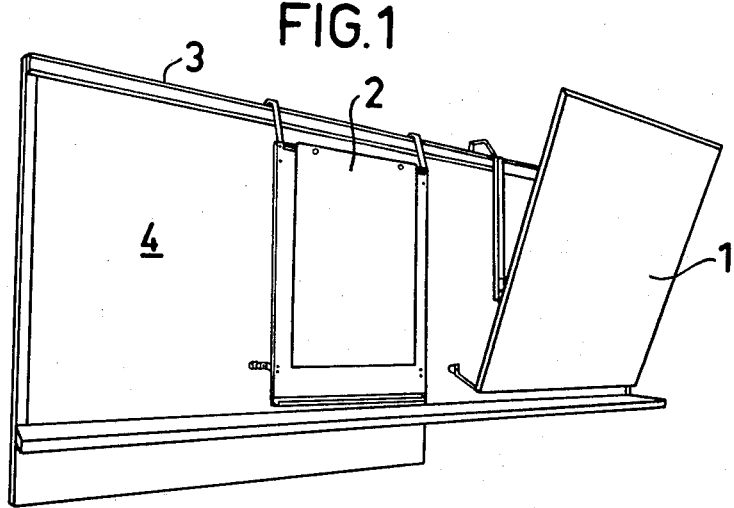
FIG. 1 is a perspective of two boards, said boards being supported by two different embodiments of the invention.

In FIG. 1 there is shown a board 1, which for instance may be a overhead screen, and there is also shown a board 2, which for instance may be a writing board or the like. The supporting means for the two boards have in common that they consist of two upper arms, which are suspended in a horizontally placed fittings 3, the form of which is described below. The fittings 3 are placed at the upper edge of a fixed board 4 and there are also two lower arms which rest on the fixed board 4. From FIG. 2 it can be seen that the fittings 3 consist of two rails 5 and 6. It can also be seen from FIG. 2 that the two upper arms 7 and 8 have each one cube 9 in which a notch is cut so it is open downwards, which notch surrounds rails 5 and 6 respectively. In this manner the arms 7 and 8 can be displaced along rail 5 and rail 6, respectively. Also, the arms are free to be lifted up from the fittings 3. From FIG. 2 it is also seen that the boards 1 and 2 are supported at their lower edges by lower arms 10 and 11 respectively, which arms have cushions 12 at their ends, whereby the boards 1 and 2 are supported by the fixed board 4. It is also obvious, that the arms 11 are shorter than the arms 10, so that the board 1 can pass outside of board 2. The arms 7 are thereby also longer than the arms 8, and cubes 9 of these arms 7 are placed on the inner rail 5 of the two rails 5 and 6.

Figure 3:
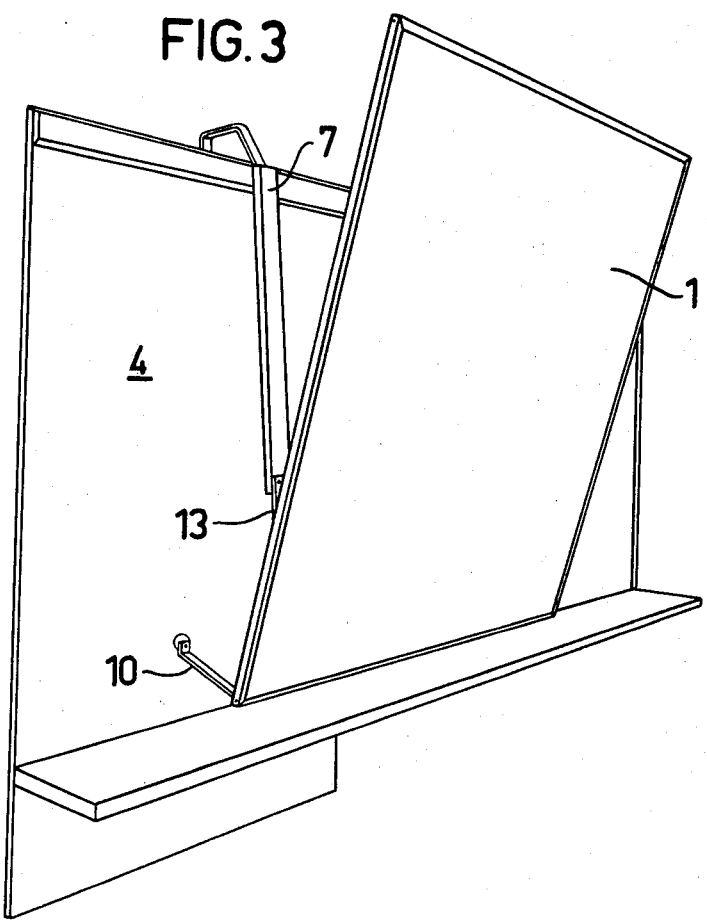
FIG. 3 is a perspective of one board supported by one embodiment of the invention.

One of the two embodiments described above is shown in FIG. 3 and it can be seen that the upper arms 7 (one of which is shown in FIG. 3) are fixed to the back side of the board 1 via a joint 13 the pivot of which is horizontal. The lower arms 10 are fixed against the back side of the board 1. Because of the relative swinging possibility between the arms 10 and the arms 7, the inclination of the board 1 in relation to the fixed board 4 or the wall is adjustable.

The second of the two embodiments described above is shown in FIG. 4. The upper arms 8 are fixed to the upper edge of the board 2. The lower arms 11 consist each of a pair of arms 14 and 15. The arm 15 is hereby shorter than the arm 14 and the arm 15 is fixed to the board 2. The arm 14 is on the other hand swingable in relation to the arm 15 and is also longer than the arm 15, whereby when the arm 14 is so placed that it lies in parallel to the arm 15 it is supported by the vertical board 4, whereby the board 2 will be placed with its lower edge further away from the board 4 than when the arm 15 is supported by the board 4. Preferably the two swingable arms 14 (one of which is only shown in FIG. 4) are connected by a link 16 so that the two arms 14 are swung together from one position to another. When the two arms 14 are swung to the position where they rest against the back side of the board 2, the second arms 15 will support the board 2 against the wall 4 and the position is the one shown in FIG. 2. Of course more than two pair of arms may be used having different length whereby other different positions for the board 2 are made possible. It is also a possibility that all the lower arms are swingable around a horizontal axis although FIG. 4 only shows that the arms 14 are swingable around around a pivot 17.

Referring now to FIGS. 5, 6 and 9 a preferred embodiment of the upper arms 8 will be described. The upper part of the arm 8 is bent so that a part 22 will be formed and this part 22 is placed mainly horizontally. On the under side of said part 22 is fastened a cube 23. The cube 23 is rotatable around the pivot 24 and thus in relation to the arm 8. The under side of the cube 23 has a recess 25, which has a form which corresponds to the cross-section of the rail 5. The recess 25 is preferably of a form which makes it surround the rail 5 to such an extent that it must be pressed onto the rail, but the cube is free to pass along the rail when it has been fastened to the rail. The cube 23 is hereby preferably formed from elastic material so that the recess opens itself when the cube is pressed on to the rail or taken away from the rail.

As mentioned above, the cube 23 is rotatable around the pivot 24 in relation to the arm 8. In order to simplify the positioning of the cube 23 in relation to the rail 5, the cube has two opposite projecting small arms 26. When the board is to be placed on the rail, these small arms will abut the wall behind the rail or abut the rails, which means that the cube 23 will be turned so that the longitudinal direction of the recess will be in the longitudinal direction of the rail. This will make it easier to hang up the board in a corner of a room, as shown in FIG. 9, because in the corner the rails will have an angle of say 90° between them in the horizontal plane. Two abutments 27 are arranged at the ends of the two small arms 26 and these abutments will abut one of the edges of the arms parts 22 when the cube is turned 45° in relation to the position shown in FIGS. 5 and 6. Thus the abutments 27 will restrict the swinging motion of the cube 23. The length of the arms 26 from the center of the pivot 24 and the position of the abutments 27 decides the possible swinging range of the cube 23 in two directions from the neutral position shown in FIG. 5 and 6. Thus the cube 23 is in its neutral position in FIG. 5 whereby the recess 25 as well as the board supported by the arm 8 are parallel to the rail on the wall and parallel to the wall. The cube can be swung to a left position or to a right position from this neutral position until one of the two abutments 27 abuts one of the outer edges 28 and 29 respectively of the arm part 22.

It has been presumed that the walls of the room form an angle of 90° in the corners as shown in FIG. 9 and, if so, the cube must be able to swing 45° in both directions from its neutral position. It should be understood, however, that other angles and swinging possibilities are possible to arrange. The object of the arms parts 26 is thus to adjust the position of the cube 23. Within the scope of the invention the arm parts 26 may differ in length and form and also the abutments 27 may be of a different shape and may have a different position than shown in FIG. 5 and 6. Also, the arms parts 26 may be fastened directly to the pivot 24 instead of being a part of the cube as shown. The arms parts 26 may also be placed on the upper side of the arm 8 instead of on the under side as shown.

Figure 7:
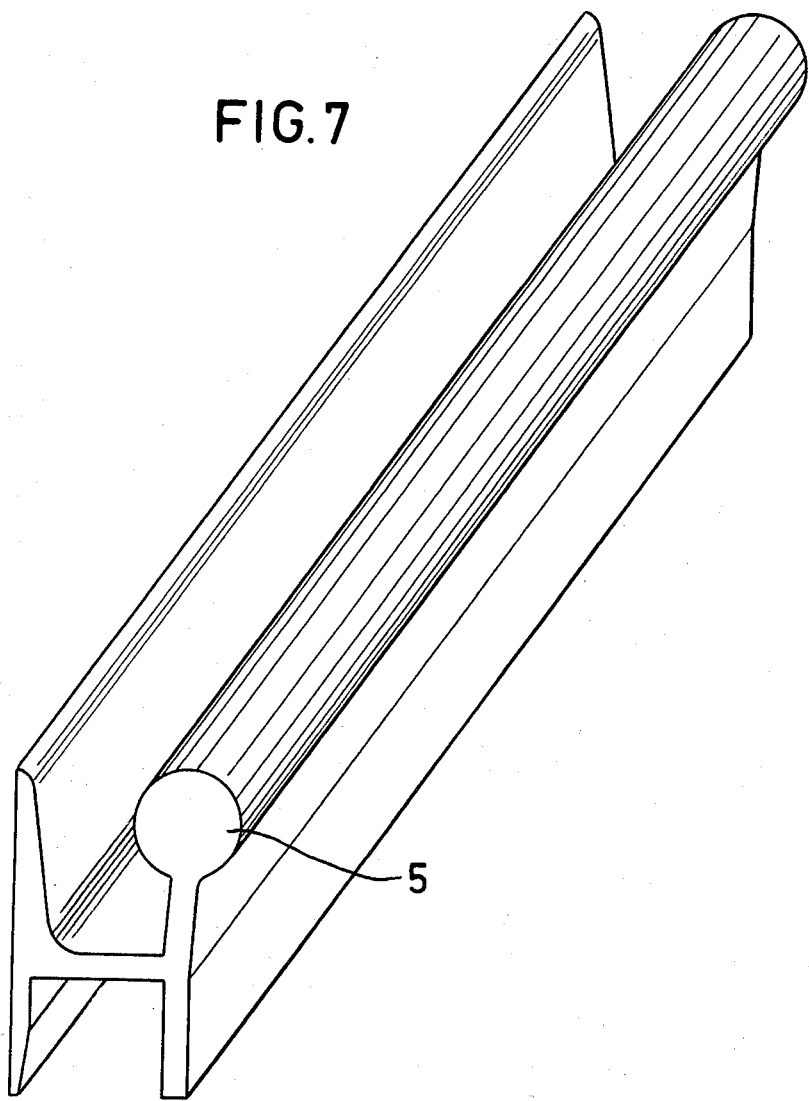
FIG. 7 is a perspective of one embodiment of the rail incorporated in one of the embodiments of the invention according to FIG. 1-4.
Figure 8:
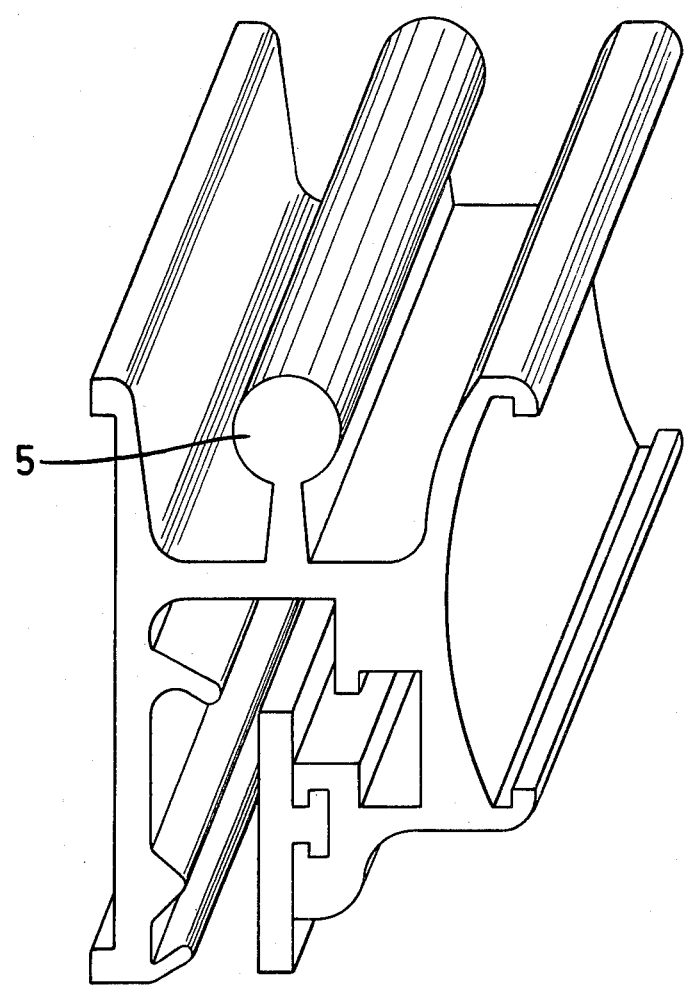
FIG. 8 is a perspective of a second embodiment said rail.

FIGS. 7 and 8 show two different forms of a rail 5 being a part of the fittings 3. When two boards are arranged on the same fittings as shown in FIGS. 1 and 2 there are two rails beside each other. It can be seen from the figures that the cross-section of the rails 5 is in the form of a key hole.

I claim:

1. Supporting means for a writing board, overhead screen, notice board or the like comprising a pair of upper arms disposed alongside one another and spaced by a certain distance, said arms being fastened to the board and displaceably suspended from upper arm ends disposed in fixed horizontal fitting means, said supporting means also including a pair of lower arms fastened to the board and supported by a fixed wall, characterized in that the pair of upper arms have downwardly opened recess means defined in their upper ends, which recess means surround a rail of the fitting means, the arms of one of said pairs of arms being swingable in relation to the arms of the second pair of arms and in relation to a horizontal axis; and further comprising means for rendering said upper arms swingable relative to the board, wherein said upper ends terminate in a cube and wherein said recess means comprise a recess formed in each cube, and means for supporting each cube pivotally in the horizontal plane of the upper arms to permit the upper arms to swing in two directions from a neutral position.

2. Supporting means according to claim 1, characterized in that the cube is formed from elastic material so that the recess can partly surround the rail and be pressed onto the rail under a predetermined deformation of the recess opening.

* * * * *